April 30, 1940.  M. WOLSKY  2,199,251
CLUTCH
Filed Jan. 19, 1938 2 Sheets-Sheet 1
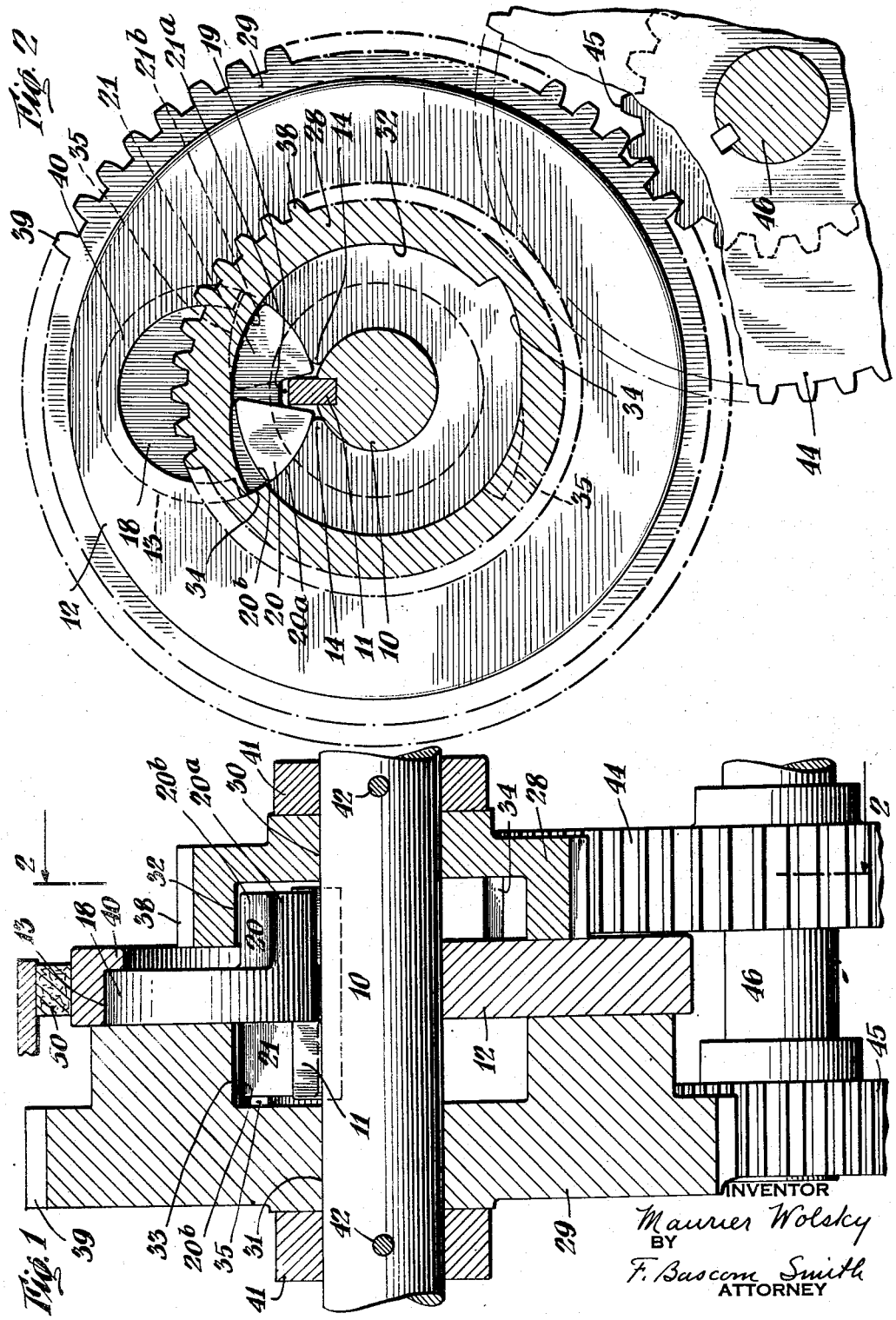
INVENTOR
Maurice Wolsky
BY
F. Bascom Smith
ATTORNEY April 30, 1940. M. WOLSKY 2,199,251
CLUTCH
Filed Jan. 19, 1938 2 Sheets-Sheet 2
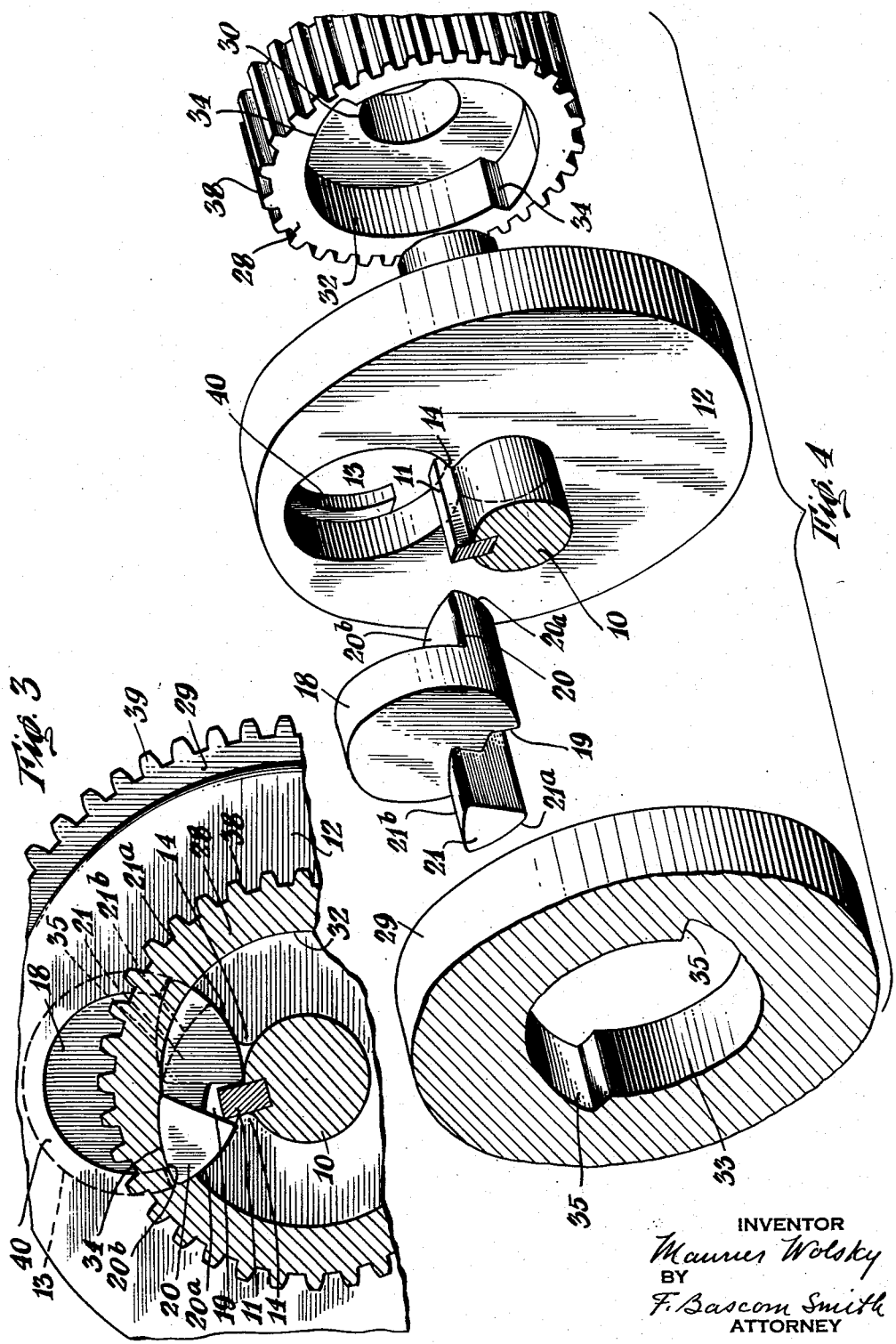
INVENTOR
Maurus Wolsky
BY
F. Bascom Smith
ATTORNEY Patented Apr. 30, 1940

2,199,251

UNITED STATES PATENT OFFICE 2,199,251

CLUTCH

Maurier Wolsky, Brooklyn, N. Y., assignor to Bendix Radio Corporation, New York, N. Y., a corporation of Delaware Application January 19, 1938, Serial No. 185,659

13 Claims. (Cl. 192—51)

This invention relates to clutches and more particularly to a clutch actuated in accordance with the direction of rotation of a drive shaft for automatically selecting and driving one of a pair of gears.

An object of the invention is to provide a novel and improved clutch of the above type which is automatically actuated to drive a reversible shaft in opposite directions at different speeds.

Another object is to provide a novel and improved clutch of the above type which is actuated in accordance with the direction of rotation of the driving means to drive a driven shaft at different speeds.

Another object is to provide a clutch adapted to be used with a film drive or the like for automatically rewinding the film at high speed when the direction of rotation of the driving motor is reversed.

A further object is to provide a novel and improved clutch which automatically selects the gear train to be driven without manual manipulation.

Another object is to provide a novel and improved clutch of the above type which is of simple and dependable construction.

The above and further objects and novel features of the invention will more fully appear from the following detailed description, when the same is taken in connection with the accompanying drawings. It is to be expressly understood, however, that the drawings are for the purpose of illustration only and are not intended as a definition of the limits of the invention, reference for this latter purpose being had primarily to the appended claims.

In the drawings:

Fig. 1 is a longitudinal section through a clutch embodying the present invention;

Fig. 2 is a transverse section, taken along the line 2—2 of Fig. 1, showing the clutch in disengaged position;

Fig. 3 is a similar partial section showing the clutch in driving position; and, Fig. 4 is a partial exploded perspective view showing the various elements of the clutch.

In the following description and in the claims certain specific terms are used for convenience in referring to various details of the invention. It is to be understood, however, that these terms are to be given as broad an interpretation as the state of the art will permit.

Referring to the drawings more in detail, the clutch is shown as driven by a drive shaft 10 which may be actuated by any convenient means, such as a reversible motor, not shown. The drive shaft 10 is provided with a projecting key 11 which is adapted to actuate the clutch elements to be described.

The clutch comprises a member 12, shown in the form of a disc, which is loosely journalled on the shaft 10 and is provided with an eccentric opening 13 adapted to receive a pawl carrier to be described. The member 12 may be made in the form of an arm or bracket journalled on the shaft 10 or may be made in any other desired form. The opening 13, in the embodiment shown, is approximately tangent to the drive shaft 10 and terminates in a pair of shoulders 14 on opposite sides of the key 11 and spaced therefrom to permit a limited rotational movement to the member 12 with respect to said shaft.

The pawl carrier comprises a carrier disc 18 which is rotatably positioned in the opening 13 of the member 12. The carrier disc 18 is provided with a keyway 19 which loosely receives key 11 of shaft 10 and cooperates therewith to cause a limited rotational movement to the carrier disc 18 in member 12.

The carrier disc 18 carries, on opposite faces thereof, axially extending pawls 20 and 21. These pawls may have surfaces 20a and 21a in the form of segments of a cylinder whose axis coincides with the axis of the carrier disc 18, and surfaces 20b and 21b in the form of segments of a cylinder whose axis, when the pawls are in neutral or disengaged position, as indicated in Fig. 2, coincides with the axis of the shaft 10.

A pair of gears 28 and 29 are loosely journalled about the shaft 10 on opposite sides of the member 12. These gears are provided with hubs 30 and 31 engaging said shaft, and with internal recesses 32 and 33 which are concentric with shaft 10 and are of a diameter to receive and provide clearance for the surfaces 20b and 21b of pawls 20 and 21 respectively. Said recesses are so arranged that when pawls 20 and 21 are in their disengaged or neutral position, as indicated in Fig. 2, the gears 28 and 29 are both free to rotate on the shaft 10 and are further provided with pawl-engaging notches 34 and 35 respectively when the pawls are shifted into suitable engaging position, as will be described.

The notches 34 in the gear 28 are adapted to cause rotation of the gear in a given direction. As seen in Fig. 2, the gear is adapted to be rotated in a counterclockwise direction. The notches 35 in the gear 29 are arranged and adapted to cause rotation of the gear 29 in the opposite direction. In the embodiment shown, two such notches are provided in each of the recesses 32 and 33. It is obvious, however, that any desired number of notches may be disposed around said recesses. In certain instances one notch may be sufficient or in other instances a plurality thereof may be used in order to reduce the amount of lost motion in shifting from one driving connection to the other.

In the embodiment shown, the gears 28 and 29 are of different sizes and are provided with teeth 38 and 39 respectively which extend axially over a portion of the gear. It is to be understood that the teeth can be disposed over the entire surface of the respective gears, if desired. In the embodiment of Fig. 1, the teeth 39 are positioned in alignment with the hub 31 and the recess 33 is formed in an axial projection of the gear 29. On the other hand, the teeth 38 of the gear 28 are in alignment with the recess 32 and the hub 30 is formed in an axial extension of the gear. It is to be understood, of course, that these constructions are optional and that the gear teeth may be arranged in any manner desired.

The carrier disc 18 is shown as held in the member 12 by means of a shoulder 40 formed on said member at one side of the opening 13, and is held between this shoulder and the gear 29. In certain instances the shoulder 40 may be omitted and carrier disc 18 held in position by the gears 28 and 29, which may bear against opposite faces thereof. The assembly, as shown, is held in position on the shaft 10 by collars 41, which may be pinned to said shaft by pins 42. The gears 28 and 29 and the cooperating elements may, however, be held in position on shaft 10 by any other suitable means.

Gears 28 and 29 may be of the same or different sizes. In the embodiment shown, the gears are of different sizes and mesh with gears 44 and 45 respectively which are rigidly mounted on a driven shaft 46. Shaft 46 may be used to drive any suitable mechanism, such, for example, as a film drive for a motion picture projector or the like. Gears 44 and 45 are adapted to drive the shaft 46 at different speeds and in different directions. The device could be arranged, however, to drive the shaft 46 at different speeds and in the same direction.

The operation may be better understood from Figs. 2 and 3. It will be noted that in the position shown in Fig. 2, the pawls 20 and 21 are both retracted with their surfaces 20b and 21b within the corresponding recesses 32 and 33 of gears 28 and 29. Assuming that the shaft 10 now begins to rotate in a counterclockwise direction, as seen in Fig. 2, the key 11, engaging keyway 19 of the carrier disc 18 causes the carrier disc to rotate in the opening 13 of member 12, thereby shifting the pawl 20 into engagement with a pawl-engaging notch 34 of gear 28. This rotational movement of carrier disc 18 continues until either pawl 20 reaches the limit of its movement in recess 32 or key 11 engages shoulder 14 on member 12. The parts are now in the position shown in Fig. 3, and further rotation of drive shaft 10 in a counterclockwise direction causes member 12, disc 18 and gear 28 to rotate as a unit, thereby establishing a driving connection between drive shaft 10 and gear 28. If pawl 20 is not in alignment with one of the pawl engaging notches 34 in gear 28 when the rotation of drive shaft 10 begins, surface 20b of said pawl will ride around in recess 32 until a notch 34 is encountered.

In order to provide sufficient drag on member 12 to insure the rotation of disc 18 in the manner above mentioned, a friction device such as a friction member 50 may be held against member 12 by any suitable means, not shown. The inertia of the parts will, however, ordinarily prove sufficient for this purpose, particularly when the direction of rotation is suddenly reversed and the friction device 50 may be omitted when not required in any particular instance.

The parts are now assumed to be operating to drive gear 28 in a counterclockwise direction. If now the direction of rotation of shaft 10 be reversed, key 11 will rotate carrier disc 18 to retract pawl 20 from engagement with pawl engaging notch 34 and will tend to shift pawl 21 into engagement with a notch 35 in gear 29. Surface 21b of pawl 21 would ride along in recess 33 until a pawl-engaging notch 35 is encountered. As soon as this takes place, gear 29 is locked in driving relationship to shaft 10 in the manner described above in connection with gear 28. Further rotation of shaft 10 accordingly drives gear 29 in a clockwise direction, gear 28 being free to rotate on shaft 10.

It will be noted that in the above-described system the reversal of drive shaft 10 serves to automatically connect either gear 28 or gear 29 in driving relationship therewith and effects both a reversal in the direction of rotation of driven shaft 46 and a change in the speed ratio thereof.

While the pawls have been shown as engaging notches in the driven gears, it is of course obvious that frictional engagement between the surfaces of the pawls and the internal surfaces of the gears could be relied upon if only a limited amount of power is to be transmitted. In that event, the rotation of the drive shaft 10 in one direction or the other would operate to bring either pawl 20 or pawl 21 into the proper frictional driving position.

The invention has been shown by way of illustration as embodied in a device which is arranged to drive a shaft 46 in opposite directions and at different speed ratios, this device being adapted, for example, to be used with a film drive, in which case the film may be rewound at a higher rate of speed. It is to be understood that the device could also be arranged to drive the shaft 46 in opposite directions at the same speed or in the same direction at different speeds, depending upon the particular combinations of gears employed.

The device is of simple and rugged construction and provides for automatically effecting the change in drive without manual adjustment of any kind and in response solely to the reversal of the drive shaft.

Although a specific embodiment of the invention has been shown for purposes of illustration, it is to be understood that the invention is not to be limited thereto, but is only to be limited in accordance with the following claims when interpreted in view of the prior art.

What is claimed is:

1. A clutch mechanism comprising a drive shaft, a pair of gears journalled thereon, a pawl carrier carried by said drive shaft having pawls adapted to selectively engage said gears for establishing a driving connection between the selected gear and said drive shaft and means responsive to a change in direction of rotation of said drive shaft for actuating said pawls to engage a selected gear.

2. A clutch mechanism comprising a drive shaft, a pair of gears journalled on said drive shaft, a pawl carrier journalled on said drive shaft for a limited movement with respect thereto, said pawl carrier carrying pawls adapted to selectively engage said gears, means responsive to movement of said drive shaft with respect to said pawl carrier for selectively actuating said pawls whereby a driving connection is established between said drive shaft and the selected gear.

3. A clutch mechanism comprising a reversible drive shaft, a pair of gears journalled thereon, a pawl carrier journalled on said drive shaft for a limited movement with respect thereto, said pawl carrier carrying pawls adapted to selectively engage said gears to establish a driving connection between the selected gear and said drive shaft, and means dependent upon the direction of rotation of said drive shaft for selectively actuating said pawls, whereby rotation of said drive shaft in one direction effects a driving connection to one of said gears and rotation of said drive shaft in the opposite direction releases the first gear and establishes a driving connection to the other of said gears.

4. A power transmission system comprising a drive shaft and a driven shaft, a pair of gear trains having different gear ratios interconnecting said shafts, each train comprising a gear loosely journalled on said drive shaft and a cooperating gear fixed to said driven shaft, and clutch means responsive to a small angular change of the drive shaft in a direction of rotation opposite to a present direction of rotation to selectively establish a driving connection between said drive shaft and one of said gears, whereby rotation of said drive shaft in one direction drives said driven shaft in one direction at a definite speed ratio and rotation of said drive shaft in the other direction serves to drive said driven shaft in the opposite direction at a different speed ratio.

5. A clutch mechanism comprising a drive shaft, a pair of gears journalled thereon, a member journalled on said drive shaft for a limited movement with respect thereto, a pair of pawls carried by said member and adapted to respectively engage said gears to establish a driving connection therewith, and means capable of movement within limits defined by said limited movement of said member with respect to said drive shaft for actuating said pawls.

6. A clutch mechanism comprising a drive shaft, a pair of gears journalled thereon, a member journalled on said drive shaft for a limited movement with respect thereto, a pair of pawls carried by said member and adapted to respectively engage said gears to establish a driving connection therewith, means responsive to rotation of said drive shaft in one direction for effecting a driving connection between one of said pawls and the corresponding gear, and means responsive to rotation of said drive shaft in the other direction for effecting a driving connection between the other of said pawls and its corresponding gear.

7. A clutch mechanism comprising a drive shaft, a pair of gears journalled thereon, a member journalled on said drive shaft for a limited movement with respect thereto, a pawl carrier journalled in said member and having a pair of pawls positioned to selectively engage said gears to establish a driving connection thereto, and means responsive to the direction of rotation of said drive shaft to selectively actuate said pawls.

8. A clutch mechanism comprising a drive shaft, a member journalled on said drive shaft for a limited movement with respect thereto, gears journalled on said shaft on opposite sides of said member, a pawl carrier comprising a disc journalled in said member and a pair of pawls extending axially on opposite sides of said disc in a position to selectively engage said gears, and means associated with said shaft for actuating said pawl carrier so as to selectively shift said pawls into engagement with said gears in response to relative movement between said shaft and said member.

9. A clutch mechanism comprising a drive shaft, a pair of gears journalled thereon, a member journalled on said drive shaft for a limited movement with respect thereto, a pawl carrier journalled for rotation in said member and carrying a pair of pawls adapted to selectively engage said gears, a key carried by said shaft and engaging said pawl carrier for actuating the same in accordance with the direction of rotation of said shaft, said member having an aperture on opposite sides of said key adapted to permit a limited relative movement between said shaft and said member, said gears having internal pawl engaging notches adapted to cooperate with said pawls for establishing a driving connection with said shaft, said pawls being adapted and arranged to selectively engage said notches when said pawl carrier is actuated in response to rotational movement of said shaft.

10. A clutch mechanism comprising a drive shaft, a pair of gears journalled thereon, a member journalled on said drive shaft for a limited movement with respect thereto, a pawl carrier journalled for rotation in said member and carrying a pair of pawls adapted to selectively engage said gears, said gears having internal pawl engaging notches adapted to cooperate with said pawls for establishing a driving connection with said shaft, said pawls being adapted and arranged to selectively engage said notches when said pawl carrier is actuated in response to rotational movement of said shaft.

11. A clutch mechanism comprising a drive shaft, a member journalled on said shaft for limited movement with respect thereto, gears journalled on said shaft on opposite sides of said member, said gears having pawl engaging notches, pawls carried by said member to engage said notches, and means responsive to rotation of said shaft to actuate said pawls for selectively driving said gears in accordance with the direction of rotation of said shaft.

12. A clutch mechanism comprising a drive shaft, a member journalled thereon having an eccentric opening, a key carried by said shaft and extending into said opening to limit the rotational movement of said member, a disc journalled in said opening and having pawls extending axially from opposite sides thereof, said pawls being so positioned on said disc that rotation of said disc shifts said pawls radially of said shaft, said disc having a keyway engaging said key for causing limited rotation of said disc when the direction of rotation of said shaft is changed, and a pair of gears journalled on said shaft on opposite sides of said member, said gears having internal pawl engaging notches adapted to receive the respective pawls when said disc is actuated, whereby rotation of said shaft in one direction establishes a driving connection to one of said gears and rotation of said shaft in the opposite direction establishes a driving connection to the other of said gears.

13. A clutch mechanism comprising a drive shaft, a member journalled thereon having an eccentric opening, a key carried by said shaft and extending into said opening to limit the rotational movement of said member, a disc journalled in said opening and having pawls extending axially from opposite sides thereof, said pawls being so positioned on said disc that rotation of said disc shifts said pawls radially of said shaft, said disc having a keyway engaging said key for causing limited rotation of said disc when the direction of rotation of said shaft is changed, and a pair of gears journalled on said shaft on opposite sides of said member, said gears having internal pawl engaging notches adapted to receive the respective pawls when said disc is actuated, and means retarding the rotation of said member until said disc has been actuated, whereby rotation of said shaft in one direction establishes a driving connection to one of said gears and rotation of said shaft in the opposite direction establishes a driving connection to the other of said gears.

MAURIER WOLSKY.